United States Patent [19]

Korpman

[11] 4,432,848
[45] Feb. 21, 1984

[54] RADIATION CURED, HIGH TEMPERATURE PRESSURE-SENSITIVE ADHESIVE

[75] Inventor: Ralf Korpman, Bridgewater, N.J.

[73] Assignee: Permacel, New Brunswick, N.J.

[21] Appl. No.: 322,626

[22] Filed: Nov. 19, 1981

[51] Int. Cl.³ .............................................. C08L 53/02
[52] U.S. Cl. ........................ 204/159.17; 204/159.12; 204/159.15; 524/274
[58] Field of Search ...................... 204/159.12, 159.15, 204/159.17; 524/274

[56] References Cited

U.S. PATENT DOCUMENTS

| | | | |
|---|---|---|---|
| 2,956,904 | 10/1960 | Hendricks | 117/93 |
| 3,681,190 | 8/1972 | Dahlquist | 524/274 |
| 3,787,531 | 1/1974 | Dahlquist et al. | 525/98 |
| 4,069,123 | 1/1978 | Skoultchi et al. | 204/159.18 |
| 4,133,731 | 1/1979 | Hansen et al. | 204/159.17 |
| 4,151,057 | 4/1979 | St. Clair et al. | 204/159.17 |

*Primary Examiner*—Wilbert J. Briggs, Sr.
*Attorney, Agent, or Firm*—Dressler, Goldsmith, Shore, Sutker & Milnamow, Ltd.

[57] ABSTRACT

Pressure-sensitive adhesives with superior high temperature adhesion properties are prepared by radiation curing of an adhesive composition comprising a simple block copolymer as the elastomer component.

6 Claims, No Drawings

RADIATION CURED, HIGH TEMPERATURE PRESSURE-SENSITIVE ADHESIVE

Pressure-sensitive adhesives, namely, those which provide attachment on activation by pressure such as finger pressure are to a great extent based on a composition comprising an elastomer and a tackifier. For adhesives of high tack and aggressive adhesiveness, the elastomer is preferably a block copolymer of a poly(alkenylarene) end blocks and conjugated diene midblocks, namely, A-B-A block copolymers. Irrespective of the chemical nature of the compositions, pressure-sensitive adhesives should have a balance of three properties: adhesion, tack and hold. For many industrial uses, it is desirable to have an adhesive which has a high service temperature, temperatures of and exceeding 300° F., and high solvent resistance. The service temperature of many adhesives have been improved by chemical cross-linking and recently there have been a couple of reported instances of radiation cross-linking. Thus, U.S. Pat. No. 2,956,904 describes radiation cure for natural rubber based pressure-sensitive adhesives and U.S. Pat. No. 4,133,731 describes radiation cure for adhesives in which the elastomer component is based on block copolymers. It has been found however, that adhesives based on A-B-A block copolymers and cured according to the aforementioned patent were unacceptable for many industrial applications. Thus, although cohesive strength and solvent resistance were high, in many applications adhesion was found to be inadequate.

According to this invention, it has been discovered that if a simple block copolymer, i.e., an A-B block copolymer is employed instead of the A-B-A block copolymer, or if the simple block copolymer replaces a major part of the A-B-A block copolymer in cured adhesive compositions, an adhesive is achieved which has heat and solvent resistance properties and which also has high adhesive properties under rigorous conditions. This is wholly unexpected because of the properties of the respective block copolymers. Simple block copolymers frequently are useful for improving tack but the soft flaccid nature of the copolymer normally renders them less suitable in adhesives where strength is desired. Thus, adhesives based on simple block copolymers have a very low mass transfer point (about 120° F.) and even in the uncured state will split or leave adhesive mass. It is expected that a great deal more energy will be required to cure an adhesive based on an A-B block copolymer than on an A-B-A block copolymer and that the product will be inferior. Thus, it is wholly unexpected that an adhesive based solely or in major part on an A-B block copolymer has all the properties essential in a pressure-sensitive adhesive and further has the properties of a superior adhesive, namely, solvent and heat resistance.

An adhesive having the desired properties of solvent resistance, high temperature cohesive strength and aggressive adhesiveness may be prepared by high energy radiation curing of a composition comprising:
(a) an elastomer component comprising an A-B block copolymer where A represents a poly(monoalkenylarene) block and B represents a polyisoprene block,
(b) a tackifier resin component comprising a polyisoprene block compatible tackifier resin, said resin being employed in an amount of from about 50 to 100 parts by weight for each 100 parts by weight of the elastomer component, and
(c) a coupling agent component, said coupling agent component being an acrylic or a methacrylic acid ester of a polyol, preferably a di- to tetra-functional polyol, in an amount of from about 5 to 25 parts by weight for 100 parts by weight of the elastomer component.

The adhesive of the present invention possesses good solvent and heat resistance, ability to withstand exposure to temperatures of 300° F. and higher while still possessing high adhesion and hold properties required for industrial uses.

The elastomer component of this invention is relatively specific. It comprises a particular block copolymer as essential component. The essential block copolymer is one having one alkenylarene polymer block end group and one isoprene polymer block end group. Thus, it is of a type of block copolymer known in the art as simple block or A-B block copolymer. The A block is preferably polystyrene but may be polymers of other alkenylarene such as α-methylstyrene, tert-butylstyrene, vinyltoluene and other ring or chain alkylated styrene derivatives. The B block is necessarily polyisoprene. Polymers in which the conjugated diene polymer block is butadiene are not deemed to be suitable as the primary component.

In the A-B block copolymers, the number average molecular weight of the individual A block is generally about 7,000 to 20,000 and the total molecular weight of the block copolymer generally should not exceed about 150,000. The A-B block copolymers based on styrene and isoprene are described generally in U.S. Pat. No. 3,787,531.

The elastomer component may be modified with a minor amount of A-B-A block copolymer of the type polystyrene-polyisoprene-polystyrene. If employed in minor amounts, the A-B-A block copolymer is of the type described in U.S. Pat. No. 4,133,731.

The tackifying resin is selected from resins compatible with the elastomeric block, namely the B block, and provides tack and adhesion properties when combined with the elastomer. It is normally solid at ambient temperature having a softening point from about 30° to 150° C. (86° to 302° F.). The exact chemical nature of the resin is not critical but the preferred resins are usually classifiable as polyhydrocarbon, rosin or rosin ester, and polyterpene. More specifically they may be polymerized petroleum hydrocarbons; rosin from various sources, e.g., gums, wood, tall oil, hydrogenated rosin, polymerized rosin; pentaerythritol or glycerol esters of rosin or hydrogenated rosin; polymerized pinene, limonene or mixed terpenes; and the like. Many suitable tackifying resins are found in Table 1 on pages 230–231, in the chapter entitled "Resins for Rubber Based Adhesives" by John F. Autenrieth, and in Table 4 on page 314 in "Thermoplastic Rubber (A-B-A block copolymers) in Adhesives" by J. P. Harlan et al., in "Handbook of Adhesives" edited by Irving Skeist, Van Nostrand Reinhold Company, New York, Second Edition (1977). Suitable tackifying resins are available commercially frequently under various trade names. Many of these are identified in the aforementioned Autenrieth and Harlan articles.

The coupling agent component are esters of an acrylic or methacrylic acid with a di- to tetra-functional polyol. Suitable polyols include 1,6-hexanediol, trimethylolpropane, pentaerythritol, 1,3-butylene glycol, 1,4-butenediol, diethylene glycol, neopentyl glycol, ethylene glycol and the like. The preferred coupling agents are trimethylolpropane trimethacrylate (TMPTM), trimethylolpropane triacrylate (TMPTA), 1,6-hexanediol diacrylate (HDODA) and 1,6-hexanediol dimethacrylate (HDODM).

The compositions may also include supplementary materials which are conventionally added to adhesive formulations for various purposes provided they do not interfere with the irradiation process. For instance, antioxidant such as 2,5-di-tertiary-amylhydroquinone and tertiary-butylhydroquinone may be used, as may heat stabilizer such as zinc salts of alkyl dicarbamates. Ultraviolet absorbers such as tetrakis[methylene 3-(3,5-ditert-butyl-4-hydroxyphenyl)propionate]methane, substituted benzotriazole, substituted hydroxyphenylbenzotriazole and the like, also may be added as may inorganic fillers, pigments and coloring agents such as zinc oxide, aluminum hydrate, carbon black, clay, calcium carbonate, titanium dioxide, and the like.

The adhesives of the present invention are prepared by the initimate mixing of the A-B block copolymer elastomer component, the tackifying resin component and the coupling agent component, with or without other additives, with heating, or in a solvent at ambient temperatures as hereinafter detailed, then coated on a temporary or permanent substrate, and thereafter subjected to high energy radiation.

Any suitable mixing and coating process may be employed. One process comprises blending and melting the materials together in the absence of solvent to a homogenous composition in an extruder and then directly coating onto a suitable backing to obtain adhesive coated sheets or films. In such process, the liquid coupling agent preferably is applied to the dry block copolymer particles and absorbed thereon by standing about 24 hours; thereafter the wetted swollen particles, the tackifier resin particles and other particulate additives, if employed, are blended and charged into the inlet of an extruder where it is melted and blended at a temperature of from about 70° to 375° F. in the extruder barrel, then passed through the die orifice and coated onto the substrate.

Alternatively, the liquid coupling agent may be metered into the hopper of an extruder along with the dry particulate elastomer, tackifier and other additives where it is melted and blended in the extruder barrel in the temperature range of from about 70° to 375° F. and then extruded and coated in a conventional manner.

Alternatively, the molten adhesive composition may be hot-rolled coated, knife coated or hot gravure coated.

In addition to the foregoing, the components may be mixed in a solvent and the dispersion coated onto a substrate. The coating of the dispersion is often spoken of as solvent coating or solution coating although the dispersion has a consistency of cement. In this method, the elastomer, tackifier and antioxidant are mixed in a solvent having a boiling point in the range of from 85° to about 120° C. and the coupling agent then added and the resulting mixture coated onto a substrate. Preferred solvents are hydrocarbon in nature; most preferred are toluene and heptane. The dispersion generally has a solid content in the range of from about 50 to 70 percent. It is desirable to maximize solid content while still retaining fluidity sufficient for coating techniques. The coating of the dispersion may be by knife-coating or roller-coating onto a backing sheet or other substrate. The coated substrate then is dried to remove a solvent and thereafter cured.

The curing or crosslinking of the coated adhesive compositions is carried out by exposure of the coated substrate to high energy radiation such as electron beam radiation. The electron beam radiation or high energy ionizing radiation can be obtained from any suitable source such as Van de Graaf electron accelerator, atomic pile, resonant transformer accelerator, Linac electron accelerator, betatron, synchrotron cyclotron, or any other source producing ionizing radiation such as electrons, protons, neutrons, deuterons, gamma rays, X-rays, $\alpha$-particles and $\beta$-particles.

The coupling reaction or cure is conveniently effected at room temperature but may be carried out at lower or higher temperatures if desired. It also may be carried out in an inert atmosphere. The amount of radiation depends primarily on the type and concentration of the acrylate or methacrylate ester employed and the level of cure desired as hereinafter detailed. A suitable dose is considered to be at least 3 megarads and although it may be as high as about 25 megarads, the preferred range is from about 3 to 12 megarads. It has been found that the irradiation dosage required varies inversely with the amount of coupling agent employed.

It is important that a certain level of cure be obtained for adequate solvent and heat resistance. This is determined initially by observing the behavior of the adhesive mass in a solvent. In carrying out this test, a piece of adhesive coated film (about 2 inch × 1 inch in size) is immersed in a bottle containing toluene solvent. The test bottles are allowed to stand for about 5 minutes and thereafter observed and graded as to level of cure according to the following rating values:

| Level of Cure | Description |
| --- | --- |
| 1 | Mass will dissolve completely in solvent. Filled masses will exhibit filler at the bottom of the bottle. Mass will come off backing when removed from the solvent. |
| 2 | Mass will cloud solvent. The mass surface will not be firm, and will be practically 100% soluble. The mass can be completely removed from the backing when disturbed with the finger or tongue depressor. |
| 3 | Mass will appear as a heavy cream and will exhibit no gel structure. It feels like a heavy fluid and will have no elastic properties when disturbed with the finger or tongue depressor. |
| 4 | The mass appears like an egg white. When disturbed with the finger or a tongue depressor, the mass feels slimy, with very little elasticity. The mass may be stretched, but only slightly before rupture |
| 5 | The mass surface will appear smooth. When disturbed with the finger or tongue depressor, it will not feel slimy, and will be more elastic than Level #4. The mass can be scraped from the backing with no difficulty. |
| 6 | The mass surface will appear solid. It will be more difficult to disturb the mass with the finger or a tongue depressor. The mass will approach a cheesy consistency with no sliminess. The mass will exhibit elasticity. |
| 7 | The mass surface will appear grainy. It will be difficult to disturb the mass with the finger or tongue depressor. The mass will be quite elastic and difficult to remove from the backing. |
| 8 | The mass surface will appear very |

| -continued | |
|---|---|
| Level of Cure | Description |
| | grainy. It is almost impossible to dislodge the mass with the finger or a tongue depressor. The mass will have the elasticity of a rubber band. Complete removal of the mass can only be accomplished by scraping it off with a tongue depressor or razor blade. |

A level of cure of at least 5 is considered to be necessary to provide a tape of proper solvent and heat resistance.

The high temperature cohesive strength of the adhesive composition as manifest in resistance to transfer of the adhesive mass to a substrate on peeling an adhesive mass at high temperature is an important property of the adhesives. The maximum temperature at which a tape can be rapidly peeled from a hot, chrome substrate without leaving an adhesive residue on the panel is designated herein as the mass transfer point (MTP). It is desirable that it be at least about 300° F. The test is run by applying a 1-inch by 7-inch strip of tape to a 4½ pound chrome roll and the roll put in an oven at 150° F. After 15 minutes it is removed and the tape stripped approximately at a 90° angle and the roll observed for transfer of adhesive mass. If no transfer is observed, the operation is repeated at 25° F. intervals until transfer is observed.

The essential property not shown by prior cured adhesives and solved by the present invention is adhesive strength as measured by adhesion to steel. The determination is carried out by peeling the tape back over itself 180° at a constant speed (by a force supplied to the free end of the tape) from a smooth steel surface to which it has been applied by a fixed pressure. This is substantially the 180° peel adhesion test PSTC-1 of the Pressure-Sensitive Tape Council. A peel adhesion value of at least 25 ounces per inch is considered essential.

Adhesive compositions which consistently meet the properties described above are useful in the preparation of pressure-sensitive adhesive tapes and labels, particularly tapes which would be useful in paint shops of automobile and plane manufacturers, as laminating adhesives in furniture manufacture, or in construction. When employed to make pressure-sensitive adhesive tapes, the adhesive composition is applied by coating onto one major surface of a backing sheet. The backing sheet may be a plastic film, paper or any other suitable material and the tape may include various other layers of coatings typically employed in tape and label manufacture such as primers, release coatings, reinforcing strands and the like.

The following examples illustrate the invention but are not to be construed as limiting:

EXAMPLE I

Adhesive compositions based on polystyrene-polyisoprene (S-I) block copolymer elastomer component and comparative adhesive composition based on polystyrene-polyisoprene-polystyrene (S-I-S) elastomer component and various blends of the two were prepared, coated on a substrate, cured by exposure to electron beam irradiation, and determinations made for extent of cure, mass transfer (temperature) point and adhesion to steel properties.

The operation was carried out by mixing the components of the adhesive compositions seen in Table I in toluene to 50 percent solids and coated on a saturated backsized paper substrate on a reverse roll coated to a coating weight of 1.5 ounces per square yard. The coated substrates were first exposed to temperatures of 250° F. to vaporize the solvent and thereafter exposed to electron beam irradiation to effect cross-linking. The dosage and the results of the tests are also seen in Table I. (Data was not tabulated if the cure was not at least 5 since this indicated an operational problem and not the effect of cure on the properties.) Compositions 1, 2, 3 and 4 represent the adhesive compositions of the present invention while compositions A, B, C and D represent compositions outside the scope of the present invention.

TABLE I

| | Composition | | | | | | | | | |
|---|---|---|---|---|---|---|---|---|---|---|
| | 1 | 2 | A | B | C | 3 | 4 | D | E | F |
| Components | | | | | | | | | | |
| S-I[1] | 100 | 75 | 50 | 25 | — | 100 | 75 | 50 | 25 | — |
| S-I-S[2] | — | 25 | 50 | 75 | 100 | — | 25 | 50 | 75 | 100 |
| Polymerized piperylene-isoprene tackifier resin[3] | 80 | 80 | 80 | 80 | 80 | 80 | 80 | 80 | 80 | 80 |
| Trimethylolpropane trimethacrylate | 10 | 10 | 10 | 10 | 10 | 20 | 20 | 20 | 20 | 20 |
| Zinc dibutyl dithiocarbamate | 2 | 2 | 2 | 2 | 2 | 2 | 2 | 2 | 2 | 2 |
| 2,5-Ditertiary-butylhydroquinone | 1 | 1 | 1 | 1 | 1 | 1 | 1 | 1 | 1 | 1 |
| TESTS | | | | | | | | | | |
| *After 5 megarad irradiation* | | | | | | | | | | |
| Cure | — | — | — | — | — | 6 | 5 | 5 | 5 | 6 |
| MTP (°F.) | — | — | — | — | — | 350 | 225 | 225 | 225 | 225 |
| Adhesion to steel | — | — | — | — | — | 28 | 28 | 25 | 22 | 23 |
| *After 10 megarads irradiation* | | | | | | | | | | |
| Cure | 6 | 7 | 7 | 7 | 7 | 7 | 7 | 7 | 7 | 7 |
| MTP (°F.) | 375 | 375 | 400 | 375 | 400 | 400+ | 400+ | 400 | 400+ | 400+ |
| Adhesion to steel (ounces per square inch) | 25 | 30 | 24 | 22 | 20 | 22 | 20 | 21 | 19 | 17 |

[1]Solprene ® 311X, Phillips Petroleum Co.
[2]Kraton ® 1107, Shell Chemical Co.
[3]Wingtack ® 95, Goodyear Tire and Rubber

EXAMPLE II

Adhesive compositions having the same components as Compositions 1 and 2 of Example I are prepared first by applying the coupling agent to dry block copolymer particles, thereafter blending the components and charging into the inlet of an extruder and extruding while the extruder barrel temperature is maintained in the range of 200° to 350° F. and the die temperature at 310° F. to obtain an extrudate which is coated on a saturated paper substrate. The coated substrates are exposed to electron beam irradiation of about 8 megarads to effect cross-linking and to obtain adhesive coated substrate testing for a cure state of greater than 5 and exhibiting mass transfer temperature of greater than 300° F. and adhesion to steel of 25 ounces per square inch or better.

I claim:

1. An adhesive possessing good solvent resistance and high temperature cohesive strength prepared by high energy radiation curing of an adhesive composition comprising
   (a) an elastomer component comprising an A-B block copolymer wherein A represents a poly(alkenylarene) block and B represents a polyisoprene block,
   (b) a tackifier resin component comprising a polyisoprene block compatible tactifier resin, said resin being employed in an amount of from about 50 to 100 parts by weight for 100 parts by weight of the elastomer component, and
   (c) a coupling agent component, said coupling agent component being an acrylic or a methacrylic acid ester of a di- to tetra-functional polyol, in an amount of from about 5 to 25 parts by weight per 100 parts by weight of the elastomer component.

2. An adhesive according to claim 1 wherein the elastomer component consist substantially solely of A-B block copolymer and wherein the amount of radiation employed is from about 3 to 12 megarads with the amount of radiation varying inversely with the amount of coupling agent.

3. An adhesive according to claim 1 wherein the elastomer component comprises a major portion of an A-B block copolymer and a minor proportion of an A-B-A block copolymer wherein A and B represent poly(alkenylarene) block and polyisoprene block respectively, and wherein the amount of radiation employed is from about 3 to 12 megarads with the amount of radiation varying inversely with the amount of coupling agent.

4. An adhesive according to claim 1 wherein the coupling agent component of the adhesive composition is trimethylolpropane triacrylate.

5. An adhesive possessing good solvent resistance and high temperature cohesive strength prepared by high energy radiation curing of an adhesive composition comprising
   (a) an elastomer component consisting substantially solely of an A-B block copolymer wherein A represents a poly(alkenylarene) block and B represents a polyisoprene block,
   (b) a tackifier resin component comprising a polyisoprene block compatible tackifier resin, said resin being employed in an amount of from about 50 to 100 parts by weight for 100 parts by weight of the elastomer component, and
   (c) a coupling agent component, said coupling agent component being an acrylic or methacrylic acid ester of a di- to tetra-functional polyol, in an amount of from about 5 to 25 parts by weight per 100 parts by weight of the elastomer component
wherein the amount of radiation employed is about 3 to about 12 megarads with the amount of radiation varying inversely with the amount of coupling agent.

6. An adhesive according to claim 5 wherein the coupling agent component of the adhesive composition is trimethylolpropane triacrylate.

* * * * *

UNITED STATES PATENT AND TRADEMARK OFFICE
CERTIFICATE OF CORRECTION

PATENT NO. : 4,432,848
DATED : February 21, 1984
INVENTOR(S) : Ralf Korpman

It is certified that error appears in the above-identified patent and that said Letters Patent is hereby corrected as shown below:

Column 7, line 18, "tactifier" should be --tackifier--.

Signed and Sealed this

First Day of April 1986

[SEAL]

Attest:

DONALD J. QUIGG

Attesting Officer     Commissioner of Patents and Trademarks